Dec. 30, 1930.        H. VAN KEUREN        1,786,878
ELECTROMAGNETIC DRAINING DEVICE
Filed Aug. 7, 1929        2 Sheets-Sheet 1
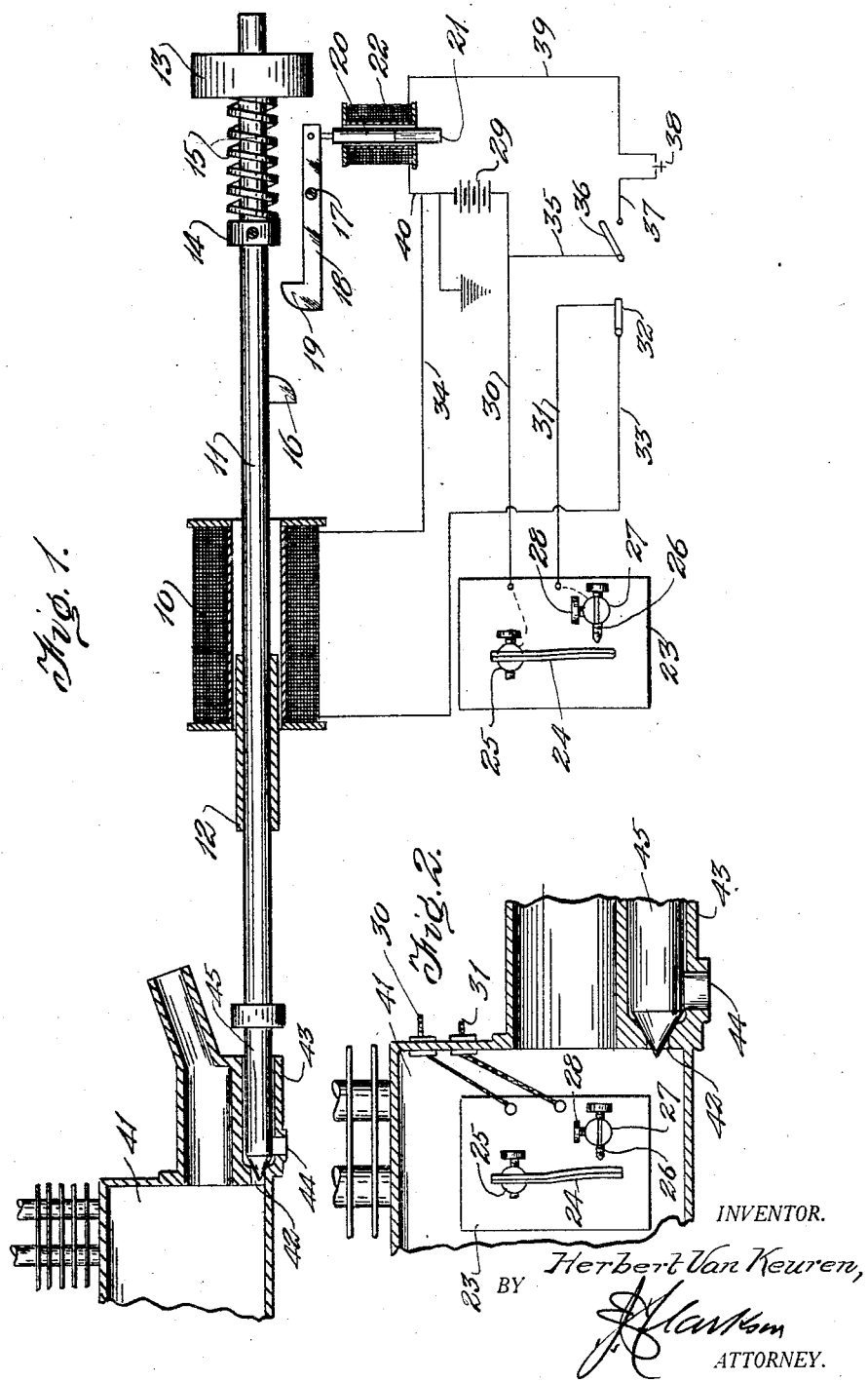

Dec. 30, 1930.  H. VAN KEUREN  1,786,878
ELECTROMAGNETIC DRAINING DEVICE
Filed Aug. 7, 1929  2 Sheets-Sheet 2
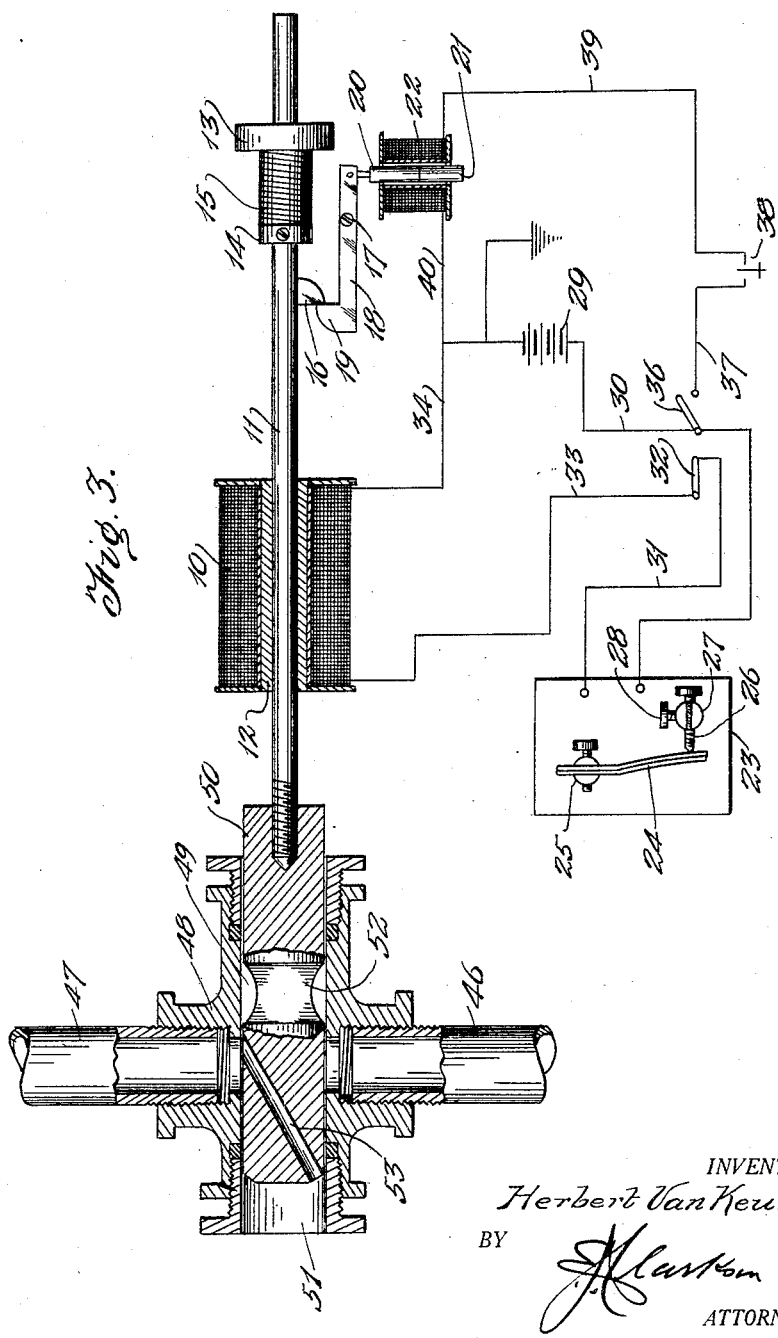
INVENTOR.
Herbert Van Keuren,
BY
ATTORNEY.

Patented Dec. 30, 1930

1,786,878

UNITED STATES PATENT OFFICE

HERBERT VAN KEUREN, OF KINGSTREE, SOUTH CAROLINA, ASSIGNOR TO THE ELECTRO AUTOMATIC DRAINAGE COMPANY, OF COLUMBIA, SOUTH CAROLINA, A CORPORATION OF SOUTH CAROLINA

ELECTROMAGNETIC DRAINING DEVICE

Application filed August 7, 1929. Serial No. 384,207.

This invention relates to an electromagnetic draining device.

In many instances receptacles such as automobile radiators, storage tanks, water pipes in houses and elsewhere, and various other receptacles are at times subjected to temperatures which cause freezing of the contents of such receptacles with the danger of bursting the receptacle itself and of producing injury to apparatus associated with the receptacle, as for instance, the enginge of an automobile as associated with the radiator. It is quite customary for the owners of automobiles to drain their radiators in cold weather when putting the automobile away for the night. It is usually very inconvenient to do this manually as the drain valve is necessarily located at the bottom of the radiator and difficult of access. Also, it is sometimes found that the temperature has not dropped as expected to a freezing point and the drainage is unnecessary. At other times one omits to drain the radiator expecting that the temperature will not drop and a sudden drop occurs resulting in freezing and damage. The same thing applies to water pipes in a house, for instance. A person leaving his house for a time in the fall may drain the pipes to prevent freezing and bursting or may leave the pipes full and a sudden drop of temperature may cause them to freeze or burst during his absence when the heating system is out of use. In addition, various types of tanks likewise should be drained at times.

One important object of the present invention is to provide a simple and efficient device for automatically draining receptacles of the kind described upon the temperature dropping to a point, predetermined by the user, below which danger will exist of freezing and bursting or freezing and interrupting circulation or the like.

A second important object of the invention is to provide an improved electromagnetic draining device of simple and economical construction and capable of application in all cases where it is desirable to drain a receptacle upon dropping of the temperature.

A third important object of the invention is to provide a device of this character wherein the valve may be restored to normal or closed position from a remote point so that at no time is it necessary for one to reach into a place inconvenient of access in order to close such valve.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side view partly diagrammatic and partly in section showing the device as applied to an automobile radiator or the like.

Figure 2 is a detail section showing a slight modification of the form shown in Figure 1.

Figure 3 is a view similar to Figure 1 but showing the device as applied to a piping system.

In each of the forms here shown the operating mechanism is alike and in these forms there is provided a solenoid winding 10 which surrounds a rod 11 which, as will hereinafter be understood, may be said to constitute a valve stem. On this rod is fixed a soft iron sleeve or cuff 12 which constitutes the core for the winding 10. At 13 is a guide bracket which is supported from any suitable object in the vicinity of the valve to be controlled and the rod or valve stem 11 runs through this bracket 13. On the stem 11 is fixed a collar 14 and between the collar and bracket 13 is a coiled compression spring 15 which surrounds the rod 11 and urges the core 12 away from the center of the winding 10 as shown in Figure 1, the spring being compressed as shown in Figure 3 upon energization of the winding 10 and movement of the core 12 centrally thereof. On the stem 11 is fixed a lug 16 and adjacent the rod 11 is a pivot 17 whereon is mounted a latch member 18. This latch member has an end 19 positioned to engage the lug 16 upon the solenoid being energized as shown in Figure 3. From the opposite end of the latch 18 is suspended a non-magnetic rod or bar 20 carrying on its lower end a solenoid core 21 which normally projects below a solenoid winding 22 so that when the solenoid 22 is energized the core 21 is raised and the end 19 dropped to free the lug 16 and permit the rod 11 to move under the influence of the spring 15.

Mounted on a suitable base 23 is a thermostat bar 24 which has one end fixed to a post 25 while the other end moves, under the influence of temperature conditions, toward and from a fixed contact 26 supported by a post 27, the contact 26 being in the form of a screw so that it may be adjusted and a clamping screw 28 being provided to hold it from accidental displacement from adjusting position. Leading from any suitable source of electric current, here indicated by the battery 29, is a wire 30 which connects with the bar 24. From the contact 26 the bar 31 leads to a switch 32 and from that switch a wire 33 leads to the winding 10 at one end thereof. The other end of said winding 10 is connected by a wire 34 with the remaining terminal of the battery 29. From the wire 30 leads a branch wire 35 which connects to a switch 36 and this switch is in turn connected by a wire 37 with a push button 38 located in any convenient position as may be desired. From the push button 38 a wire 39 leads to the winding 22 and from the other end of this winding a wire 40 connects to the wire 34 and thus to the battery 29.

It will be noted that the thermostat may either be exterior to the tank as shown in Figures 1 and 3 or located in the tank or receptacle as shown in Figure 2.

In Figure 1 the device is disclosed as it is used when applied to any form of tank or the like, it being here shown in connection with an automobile radiator, the lower part of which is indicated at 41. A drain port 42 is provided at the bottom of this radiator and communicates with a valve casing 43 having a lateral drain port 44. In this valve casing slides a valve 45 which is fixed on the end of the rod 11. Obviously, as will be seen from Figure 1, energization of the solenoid 10 moves the valve 45 off its seat and permits communication between the ports 42 and 44 so that under such circumstances, with the valve open, the radiator or tank or the like will be drained while closing of the valve permits refilling of such radiator or tank.

In the form of the device shown in Figure 3 there is disclosed the arrangement of the apparatus for draining piping and in this form it will be seen that there is provided a pipe having a lower or inlet portion 46 and an upper or outlet portion 47 which are connected opposite each other to a valve casing 48 having a through passage 49 at right angles to the pipes. Slidable in this passage is a plug valve 50 carried on the end of the stem 11 and one end of the passage is open as at 51. Intermediate the ends of the valve there is provided a reduced portion 52 which, when alined with the pipe sections, permits flow from the pipe 46 to the pipe 47. Also, the end of the valve 50 adjacent the open end 51 of the casing is provided with a diagonal bleeder port or passage 53 which, upon energization of the solenoid 10, is positioned to afford communication from the outlet section or portion 47 of the pipe to the outlet 51 as clearly shown in Figure 3. In both of these forms the operation is as follows. When the temperature reaches the limit to which the thermostatic circuit closer is set the bar 24 will contact with the contact 26 and current will then flow from the battery 29 through the wire 30, bar 24, contact 26, wire 31, switch 32, wire 33, solenoid winding 10, and wire 34 back to the battery. This will cause the core 12 to be drawn to the center of the solenoid and open the valve in Figure 1 or move the valve to open the bleeder passage 53 in Figure 3. Likewise the lug 16 will be engaged by the end 19 of the latch and the valve will be held in the draining position even though the temperature rises and the circuit just described is broken. When it is desired to close the valve the push button 38 is pushed, the switch 36 being normally closed, and current will then flow from the battery 29 through the wire 30, wire 35, switch 36, wire 37, push button 38, wire 39, solenoid winding 22 and wire 40 back to the battery. This will energize the solenoid and raise the core 21 to trip the latch 18 and release the rod 11. Thereupon the spring 15 will force the valve to the left. In the form shown in Figure 1 this will close the valve and in the form shown in Figure 3 this will close the bleeder port and open the main port.

In some instances it may be desired to fill the tank or turn the water on while the temperature is still below the critical point. For instance, one may wish to fill his automobile radiator in the morning while the temperature is below freezing since once the radiator is filled and the water in circulation through the water jacket of the engine the temperature of the parts will rise and the water will not freeze. In such instances as this the switch 32 may be opened temporarily until the water in the radiator warms up or the engine warms up enough to break the circuit in the thermostatic circuit closer. This switch 32 being open the push button may be pressed with the result as before noted.

Inasmuch as it has already been stated that "receptacles" as herein used comprehend automobile radiators, storage tanks, pipes and various other receptacles it is to be understood that the word "receptacle" as used in the claims hereto appended is likewise to be understood broadly to include all forms of devices for containing liquid.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:—

1. The combination with a water receptacle having a drain opening, a valve controlling said drain opening, thermostatically controlled means for opening said valve upon dropping of the temperature to a predetermined point, releasable latch means engaging and holding said valve in open position upon opening thereof, and electro-magnetic means for moving said latch to release position and including a normally open circuit and means to close the same.

2. The combination with a water receptacle having a drain opening, a valve controlling said drain opening, a stem on said valve, a solenoid core carrying said stem, a solenoid winding associated with said core to open the valve upon energization of the winding, a thermostatic circuit closer, circuit connections between said circuit closer and winding, releasable latch means engaging and holding said valve in open position upon opening thereof, and electro-magnetic means for moving said latch to release position and including a normally open circuit and means to close the same.

3. The combination with a water receptacle having a drain opening, a valve controlling said drain opening, a stem on said valve, a solenoid core carrying said stem, a solenoid winding associated with said core to open the valve upon energization of the winding, a thermostatic circuit closer, circuit connections between said circuit closer and winding, an extension on said solenoid core, a spring surrounding said extension and urging said valve to close and the core to move against the action of said winding, a lug on said extension, and a latch pivoted to engage said lug upon the solenoid being energized and the spring compressed.

4. The combination with a water receptacle having a drain opening, a valve controlling said drain opening, a stem on said valve, a solenoid core carrying said stem, a solenoid winding associated with said core to open the valve upon energization of the winding, a thermostatic circuit closer, circuit connections between said circuit closer and winding, an extension on said solenoid core, a spring surrounding said extension and urging said valve to close and the core to move against the action of said winding, a lug on said extension, a latch pivoted to engage said lug upon the solenoid being energized and the spring compressed, and releasable latch means engaging and holding said valve in open position upon opening thereof.

5. The combination with a water receptacle having a drain opening, a valve controlling said drain opening, a stem on said valve, a solenoid core carrying said stem, a solenoid winding associated with said core to open the valve upon energization of the winding, a thermostatic circuit closer, circuit connections between said circuit closer and winding, and extension on said solenoid core, a spring surrounding said extension and urging said valve to close and the core to move against the action of said winding, a lug on said extension, a latch pivoted to engage said lug upon the solenoid being energized and the spring compressed, a second solenoid including a winding and a core, a connection between the second core and said latch to free the latch upon energization of said second solenoid, a manually operable circuit closer, and circuit connections between said last circuit closer and the winding of said second solenoid.

6. The combination with a water pipe having an inlet and an outlet portion, said pipe having a valve casing interposed between said inlet and outlet portions provided with a drain outlet, a valve movable in said casing to connect the pipe portions in one position and to connect the outlet portion and drain outlet in a second position, said valve being normally positioned to connect said pipe portions, thermostatically controlled electro-magnetic means for moving said valve to place the outlet portion of the pipe in communication with the drain outlet upon dropping of the temperature to a predetermined point, a releasable latch means engaging and holding said valve in open position upon opening thereof, and electro-magnetic means for moving said latch to release position and including a normally open circuit and means to close the same.

In testimony whereof I affix my signature.

HERBERT VAN KEUREN.